(12) United States Patent
Kuhlmann

(10) Patent No.: US 8,322,769 B2
(45) Date of Patent: Dec. 4, 2012

(54) MULTIFUNCTION DEVICE

(75) Inventor: Klaus Kuhlmann, Nauheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/819,464

(22) Filed: Jun. 21, 2010

(65) Prior Publication Data
US 2011/0062739 A1    Mar. 17, 2011

(30) Foreign Application Priority Data

Jun. 22, 2009 (DE) .......... 10 2009 029 710

(51) Int. Cl.
*B60R 13/00* (2006.01)
(52) U.S. Cl. .......... 296/24.34; 296/37.12; 224/483
(58) Field of Classification Search .......... 296/24.34, 296/37.12; 224/483, 282
See application file for complete search history.

(56) References Cited

U.S. PATENT DOCUMENTS

| | | | |
|---|---|---|---|
| 4,239,277 A * | 12/1980 | Oda .......... | 296/37.12 |
| 5,102,181 A | 4/1992 | Pinkney | |
| 6,176,534 B1 * | 1/2001 | Duncan .......... | 296/37.12 |
| 6,394,526 B1 * | 5/2002 | Gyllenspetz .......... | 296/70 |
| 6,448,893 B1 | 9/2002 | Dobberkau et al. | |
| 6,582,002 B2 * | 6/2003 | Hogan et al. .......... | 296/37.12 |
| 6,709,041 B1 * | 3/2004 | Hotary et al. .......... | 296/70 |
| 6,720,937 B1 | 4/2004 | Neugart et al. | |
| 7,097,082 B2 * | 8/2006 | Wallaker .......... | 224/483 |
| 7,168,749 B2 | 1/2007 | Schmidt et al. | |
| 7,290,818 B2 | 11/2007 | Haba et al. | |
| 7,407,212 B2 * | 8/2008 | Kataoka et al. .......... | 296/37.12 |
| 7,543,871 B2 | 6/2009 | Quigley et al. | |
| 2006/0066120 A1 | 3/2006 | Svenson et al. | |
| 2008/0150307 A1 | 6/2008 | Quigley et al. | |

FOREIGN PATENT DOCUMENTS

| | | |
|---|---|---|
| DE | 7914904 U1 | 8/1979 |
| DE | 3708404 A1 | 9/1988 |
| DE | 4002241 A1 | 8/1991 |
| DE | 4445826 A1 | 6/1996 |

(Continued)

OTHER PUBLICATIONS

British Patent Office, British Search Report for British Application No. GB1006573.8, Aug. 11, 2010.

(Continued)

*Primary Examiner* — Lori Lyjak
(74) *Attorney, Agent, or Firm* — Ingrassia Fisher & Lorenz, P.C.

(57) ABSTRACT

A multifunction device to be situated within a central console of a motor vehicle has an instrument panel for receiving one or more elements (e.g., display and/or operating elements), the instrument panel being designed as movable and being transferable from a closed position into an open position, the instrument panel being situated within an opening of the central console in the closed position. Furthermore the central console has a storage element, which is situated outside the field of vision of the vehicle occupants in the closed position of the instrument panel and which is freely accessible to the vehicle occupants in the open position of the instrument pane. It is thus possible to provide a multifunction device to be situated within a central console of a motor vehicle, which is particularly easily reachable for the driver of the motor vehicle and simultaneously can increase the possible useful space within a motor vehicle.

20 Claims, 4 Drawing Sheets

FOREIGN PATENT DOCUMENTS

| | | |
|---|---|---|
| DE | 19942521 A1 | 4/2001 |
| DE | 19951968 A1 | 5/2001 |
| DE | 19951986 C1 | 8/2001 |
| DE | 10063190 A1 | 6/2002 |
| DE | 102006013508 A1 | 12/2006 |
| DE | 102008027060 A1 | 12/2008 |
| EP | 0927656 A2 | 7/1999 |
| GB | 2418188 A | 3/2006 |
| GB | 2420454 A | 5/2006 |
| GB | 2423345 A | 8/2006 |
| GB | 2466448 A | 6/2010 |
| WO | 0108927 A1 | 2/2001 |

OTHER PUBLICATIONS

German Patent Office, German Search Report for Application No. 102009029710.3, dated Nov. 18, 2009.

* cited by examiner

MULTIFUNCTION DEVICE

CROSS-REFERENCE TO RELATED APPLICATION

This application claims priority to German Patent Application No. 102009029710.3, filed Jun. 22, 2009, which is incorporated herein by reference in its entirety.

TECHNICAL FIELD

The invention relates to a multifunction device to be situated within a central console of a motor vehicle.

BACKGROUND

Multifunction devices inside a motor vehicle typically have an instrument panel, which comprises, for example, radio and navigation elements and operating elements for the air conditioner, ventilation devices, warning signal system, and display elements for these operating elements. Multifunction devices of this type are typically situated within a central console adjoining the dashboard between a driver seat and a passenger seat of the motor vehicle. It is typically problematic in the known solutions that these multifunction devices are only visible and/or operable with difficulty for the driver while driving the motor vehicle, so that the driver is easily distracted by reaching and operating the multifunction device and can no longer concentrate to the required extent on the traffic. In addition, the number of the required operating and display elements rises through advancing technology, whereby the available space within a motor vehicle for storage and cargo capabilities is further restricted, for example.

At least one object of the present invention is therefore to provide a multifunction device to be situated within a central console of a motor vehicle, which is easily reachable by the driver of the motor vehicle in particular and simultaneously, can increase the possible usable space within a motor vehicle. In addition, other objects, desirable features, and characteristics will become apparent from the subsequent summary and detailed description, and the appended claims, taken in conjunction with the accompanying drawings and this background.

SUMMARY

The multifunction device according to an embodiment of the invention to be situated within a central console of a motor vehicle has an instrument panel for receiving display elements and/or operating elements, the instrument panel being designed as movable and being transferable from a closed position into an open position, the instrument panel being situated within an opening of the central console in the closed position. Furthermore, the multifunction device has a storage element, which is situated outside the field of vision of the vehicle occupants in the closed position of the instrument panel and which is freely accessible to the vehicle occupants in the open position of the instrument panel.

The multifunction device is distinguished in that the instrument panel, on which display elements and/or operating elements are situated, is movably transferable from a closed position into an open position. In the closed position, the instrument panel is situated within an opening of the central console, so that the surface of the instrument panel pointing toward the vehicle interior preferably terminates flush with the surface of the central console. In the open position, the instrument panel is moved out of the opening of the central console, preferably moved out of the opening of the central console in such a way that the driver can more easily view and operate the instrument panel. The movement of the instrument panel can be performed manually or also automatically.

Viewed from the vehicle interior, a storage element is situated behind the instrument panel according to an embodiment of the invention, which is situated within the opening of the central console, outside the field of view of the vehicle occupants located in the vehicle interior, in the closed position of the instrument panel, so that the instrument panel conceals the storage element in this position. In the open position of the instrument panel, the storage element is freely accessible to the vehicle occupants, the storage element being able to remain in the opening of the central console or being able to move out of the opening together with the instrument panel. The storage element can have multiple compartments, for example, in which smaller objects such as keys, mobile telephones, wallets, etc., may be stowed. The storage element can also comprise a larger tray, for example, in which larger objects such as handbags, street maps, or bottles may be deposited.

According to an advantageous embodiment of the invention, the instrument panel is mounted so it is pivotable around an axis situated essentially vertically to the roadway. The instrument panel is preferably implemented as pivotable in the direction of the driver's seat, so that the instrument panel is better visible and operable for the driver in the open position. The vertical pivot axis of the instrument panel is situated on the side of the instrument panel pointing in the direction of the driver's seat. The instrument panel can be suspended on a guide rod, via which the lateral rotational movement can be executed.

Furthermore, according to a further embodiment of the invention, the instrument panel can be mounted so it is pivotable around an axis situated essentially transversely to the roadway. The pivot axis situated transversely to the roadway preferably extends in the area of the central console from the driver's seat to the passenger seat, so that upon a movement of the instrument panel from the closed position into the open position, the instrument panel is pivoted downward in the direction of the vehicle floor. Through the pivot movement of the instrument panel in the direction of the vehicle floor, the storage element situated behind it is well reachable in particular for the driver, even during travel.

Furthermore, according to a further advantageous embodiment of the invention, the instrument panel can also be designed as movable essentially linearly to the roadway. The instrument panel can be situated in guide rails, for example, via which the instrument panel can be moved out of the opening using a linear movement, preferably parallel to the roadway, so that the storage element situated behind the instrument panel is freely accessible to the vehicle occupants.

According to a further embodiment of the invention, the storage element is designed as movable together with the instrument panel. The storage element is preferably situated on the instrument panel in such a way that the storage element follows the movement of the instrument panel, and during a movement of the instrument panel from the closed position into the open position, it is also at least partially moved out of the opening of the central console. Because the storage element is at least partially positioned outside the opening of the central console in the open position of the instrument panel, it is reachable more easily for the vehicle occupants and objects may be stored more easily in the storage element.

According to a further embodiment of the invention, a spring element is provided for transferring the instrument panel from the closed position into the open position. The movement of the instrument panel from the closed position into the open position can be performed by exerting a pressure on the instrument panel or on an opening button, for example, so that the instrument panel is moved out of the opening of the central console actuated by spring force. For the return movement from the open position into the closed position, a light pressure on the instrument panel can also suffice. The movement of the instrument panel can thus be implemented particularly easily and using the fewest possible components by the spring element. A functional representation of the spring element is represented in FIG. 4 as spring element 40 in accordance with an exemplary embodiment.

Furthermore, according to an advantageous embodiment of the invention, a damping element can be provided for the control of the movement of the instrument panel. The damping element prevents a sudden movement of the instrument panel during the opening or closing movement of the instrument panel, so that the instrument panel and the display and operating elements situated on the instrument panel are protected. A functional representation of the damping element is represented in FIG. 4 as damping element 42 in accordance with an exemplary embodiment.

According to a further advantageous design of the invention, locking means are provided for fixing the instrument panel in a desired position. The instrument panel can also be engaged in a half-open position using the locking means, for example. A functional representation of the locking means is represented in FIG. 4 as lock 44 in accordance with an exemplary embodiment.

Furthermore, a central console is provided in accordance with an embodiment of the invention that comprises a multi-function device implemented and refined as described above.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to application and uses. Furthermore, there is no intention to be bound by any theory presented in the preceding background or summary or the following detailed description.

Figure 1:
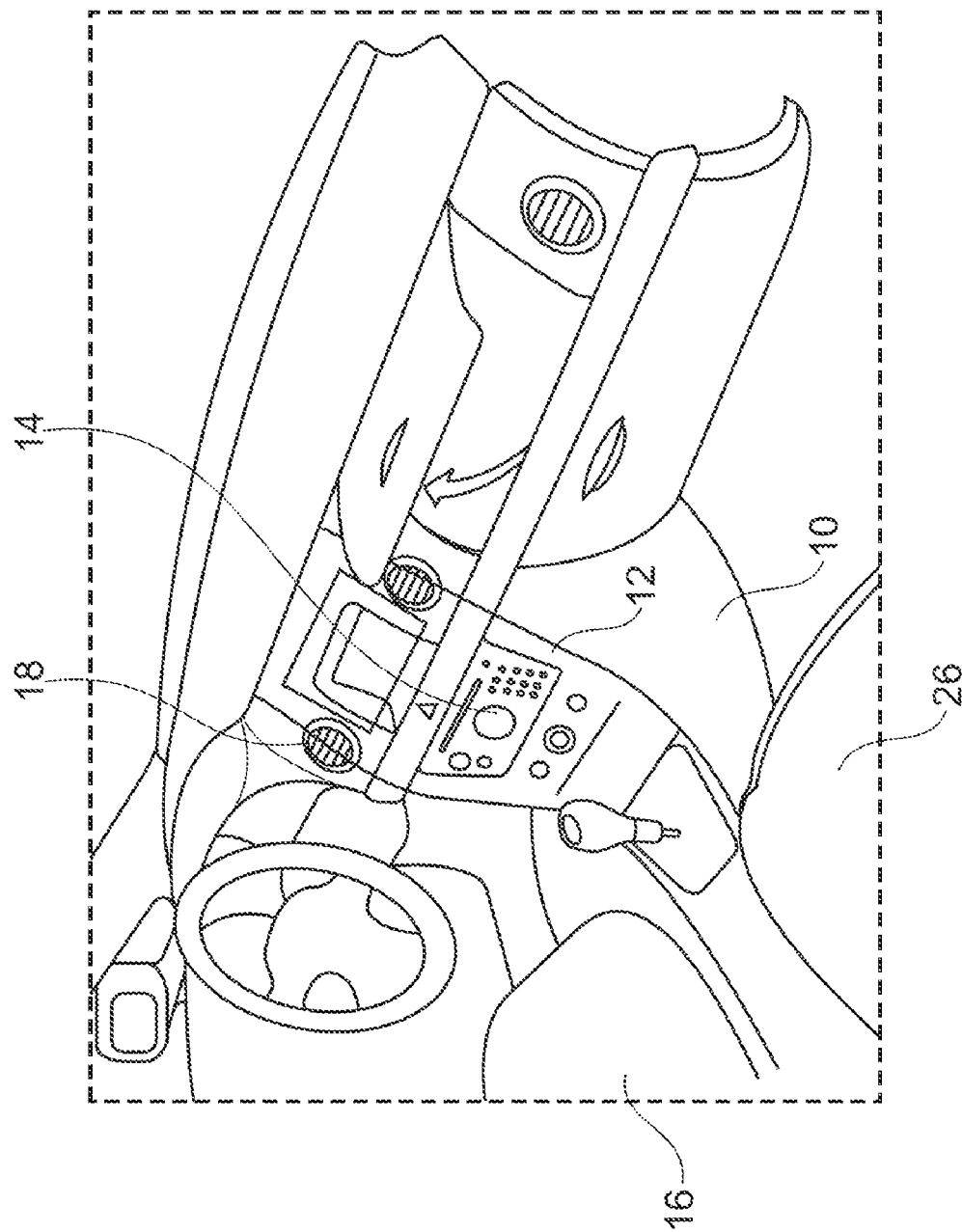
FIG. 1 shows a schematic illustration of a central console according to an embodiment of the invention in a closed position.

A multifunction device according to the invention to be situated within a central console 10 of a motor vehicle is shown in FIG. 1, which has an instrument panel 12 for receiving display elements and/or operating elements 14. The instrument panel 12 is designed as movable and transferable from a closed position into an open position, the instrument panel 12 being situated within an opening of the central console 10 in the closed position shown in FIG. 1. The surface of the instrument panel 12 pointing into the vehicle interior preferably terminates flush with the surface of the central console 10.

Figure 2:
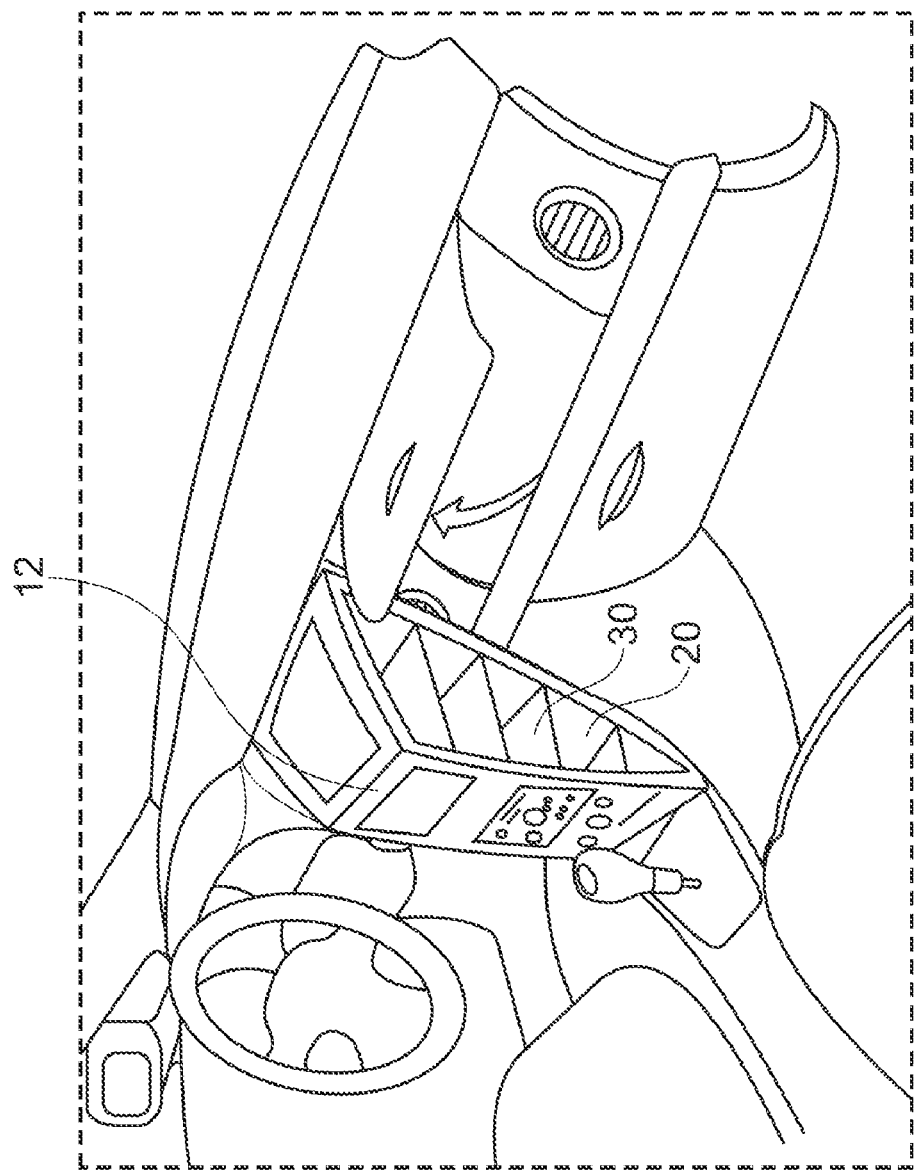
FIG. 2 shows a schematic illustration of a central console according to the invention in an open position according to a first embodiment.

FIG. 2 shows the instrument panel 12 in an open position according to a first embodiment. The instrument panel 12 is mounted so it is pivotable around an axis situated essentially vertically to the roadway for this purpose. As shown in FIG. 2, the instrument panel 12 is designed as pivotable in the direction of the driver's seat 16, so that the instrument panel 12 is better visible and operable for the driver in the open position. The vertical pivot axis of the instrument panel 12 is situated on the side 18 of the instrument panel pointing in the direction of the driver's seat 16. The instrument panel 12 can be suspended on a guide rod, via which the lateral rotational movement can be executed. In the embodiment shown in FIG. 2, the storage element 20 is designed as movable together with the instrument panel 12.

Viewed from the vehicle interior, a storage element 20 is situated behind the instrument panel 12, which is situated within the opening of the central console 10, outside the field of vision of the vehicle occupants located in the vehicle interior, in the closed position of the instrument panel 12, so that the instrument panel 12 conceals the storage element 20 in this position. In the open position of the instrument panel 12, the storage element 20 is freely accessible to the vehicle occupants, the storage element 20 being able to remain in the opening of the central console 10 or move out of the opening together with the instrument panel 12. The storage element 20 can have multiple compartments 30, for example, in which smaller objects such as keys, mobile telephones, wallets, etc., may be stowed. The storage element 20 can also consist of a large tray, however, in which larger objects such as handbags, street maps, or bottles may be deposited.

Figure 3:
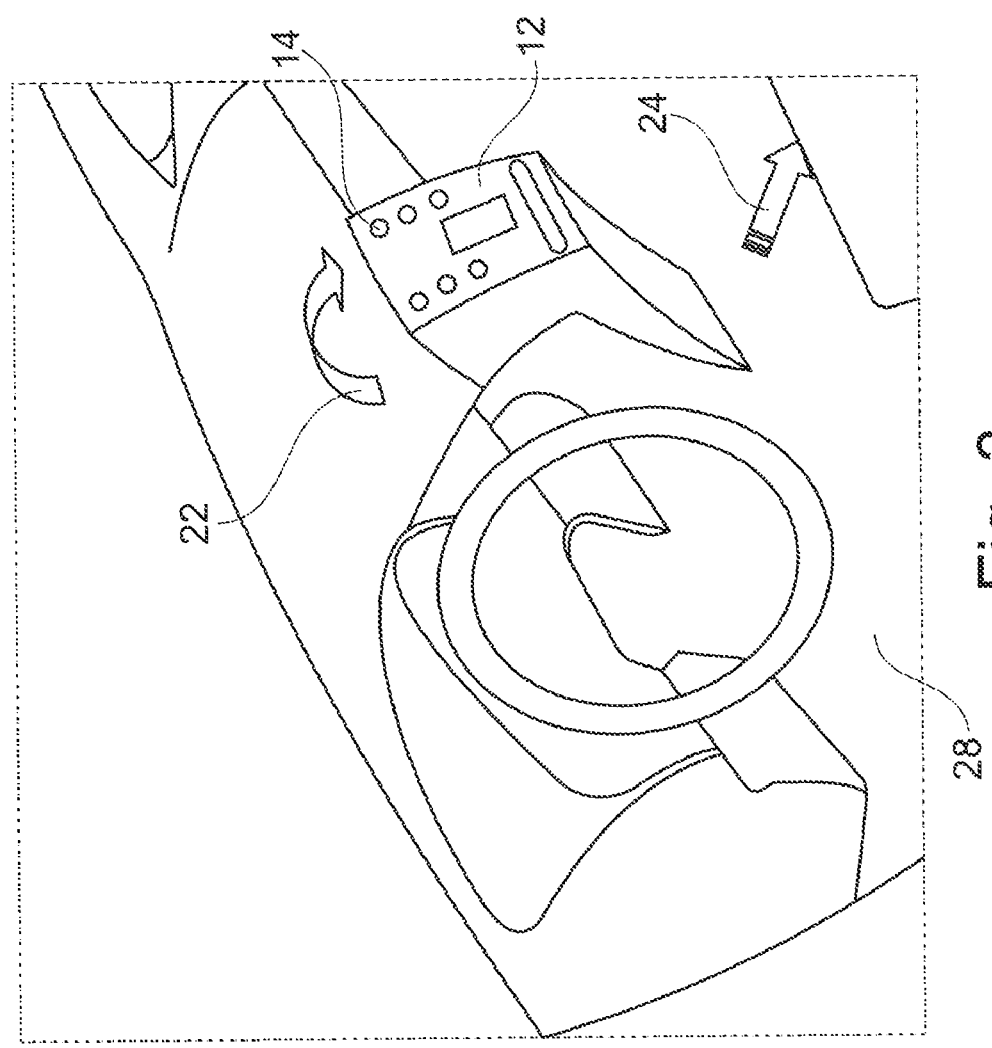
FIG. 3 shows a further schematic illustration of a central console according to the invention in an open position according to a second and a third embodiment.
Figure 4:
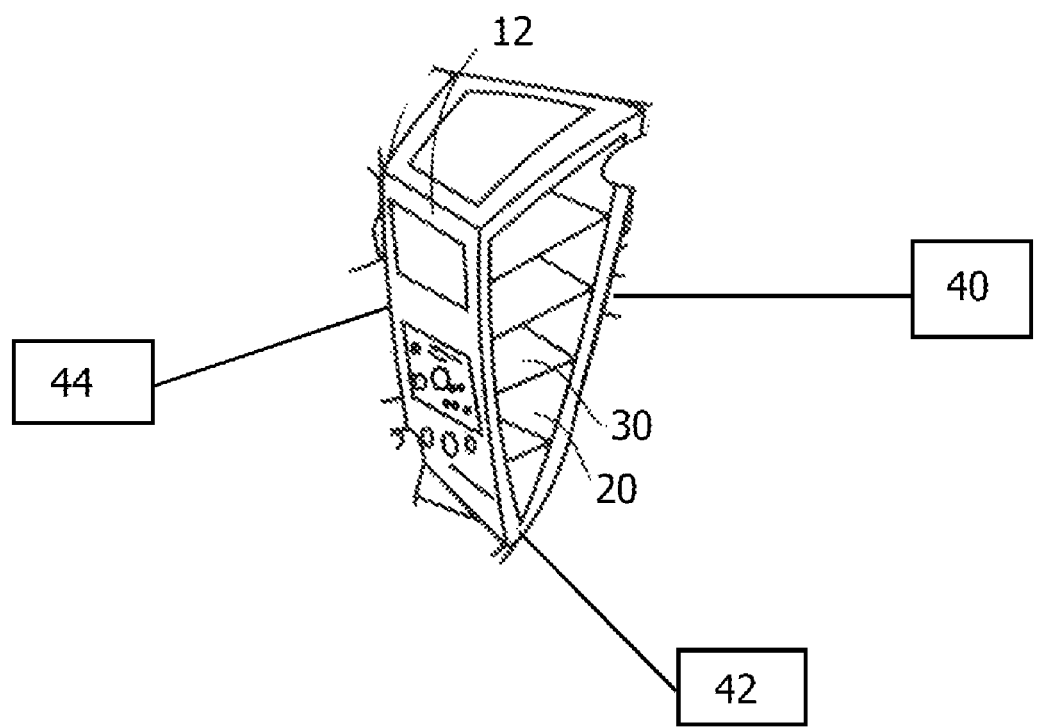
FIG. 4 shows a schematic illustration of an instrument panel of a central console (such as a central console in accordance with embodiments of FIGS. 1-3) that includes a spring element, a lock, and a damping element in accordance with an exemplary embodiment.

FIG. 3 shows two further possible embodiments for movement possibilities of the instrument panel 12. As illustrated by arrow 22, according to a second embodiment of the invention, the instrument panel 12 can be mounted so it is pivotable around an axis situated essentially transversely to the roadway. The pivot axis situated transversely to the roadway preferably extends in the area of the central console 10 from the driver's seat 16 to the passenger seat 26, so that during a movement of the instrument panel 12 from the closed position into the open position, the instrument panel 12 can be pivoted downward in the direction of the vehicle floor 28. Through the pivot movement of the instrument panel 12 in the direction of the vehicle floor 28, the storage element 20 situated behind it is well reachable for the driver in particular even during travel.

Furthermore, according to a third embodiment, the instrument panel 12 can be designed as movable essentially linearly to the roadway as indicated by arrow 24. The instrument panel 12 can be situated in guide rails, for example, via which the instrument panel 12 can be moved out of the opening using a linear movement, preferably parallel to the roadway, so that the storage element 20 situated behind the instrument panel 12 is freely accessible to the vehicle occupants.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A multifunction device to be situated within a central console of a motor vehicle, comprising
an instrument panel adapted to receive an element, the instrument panel adapted to move and transfer from a closed position into an open position and situated within an opening of the central console in the closed position;
a storage element that is situated outside a field of vision of a vehicle occupant in the closed position of the instrument panel and that is accessible to a vehicle occupant in the open position of the instrument panel; and
a lock adapted to fix the instrument panel in a desired position.

2. The multifunction device according to claim 1, wherein the element is a display element.

3. The multifunction device according to claim 1, wherein the element is an operating element.

4. The multifunction device according to claim 1, wherein:
the instrument panel is mounted to pivot around an axis situated essentially vertically to a roadway;
the instrument panel is disposed within the opening when in the closed position; and
the instrument panel moves out of the opening and toward a driver seat of the vehicle when pivoting around the axis that is situated essentially vertically to the roadway.

5. The multifunction device according to claim 1, wherein the instrument panel is mounted to pivot around an axis situated essentially transversely to a roadway.

6. The multifunction device according to claim 1, wherein the instrument panel is adapted to move essentially linearly to a roadway.

7. The multifunction device according to claim 1, wherein the storage element is adapted to move together with the instrument panel.

8. The multifunction device according to claim 1, further comprising a spring element that is adapted to transfer the instrument panel from the closed position into the open position.

9. The multifunction device according to claim 1, further comprising a damping element that is adapted to control a movement of the instrument panel.

10. A motor vehicle, comprising:
a central console;
a multifunction device situated within the central console, the multifunction device comprising:
an instrument panel adapted to receive an element, the instrument panel adapted to move and transfer from a closed position into an open position and situated within an opening of the central console in the closed position;
a storage element that is situated outside a field of vision of a vehicle occupant in the closed position of the instrument panel and that is accessible to a vehicle occupant in the open position of the instrument panel; and
a spring element that is adapted to transfer the instrument panel from the closed position into the open position.

11. The motor vehicle according to claim 10, wherein the element is a display element.

12. The motor vehicle according to claim 10, wherein the element is an operating element.

13. The motor vehicle according to claim 10, wherein:
the instrument panel is mounted to pivot around an axis situated essentially vertically to a roadway;
the instrument panel is disposed within the opening when in the closed position; and
the instrument panel moves out of the opening and toward a driver seat of the vehicle when pivoting around the axis that is situated essentially vertically to the roadway.

14. The motor vehicle according to claim 10, wherein the instrument panel is mounted to pivot around an axis situated essentially transversely to a roadway.

15. The motor vehicle according to claim 10, wherein the instrument panel is adapted to move essentially linearly to a roadway.

16. The motor vehicle according to claim 10, wherein the storage element is adapted to move together with the instrument panel.

17. The motor vehicle according to claim 10, further comprising a damping element that is adapted to control a movement of the instrument panel.

18. The motor vehicle according to claim 10, further comprising a lock adapted to fix the instrument panel in a desired position.

19. A multifunction device to be situated within a central console of a motor vehicle, comprising
an instrument panel adapted to receive an element, the instrument panel mounted to pivot around an axis that is situated essentially vertically to a roadway from a closed position to an open position, wherein the instrument panel is disposed within the opening when in the closed position, and wherein the instrument panel moves out of the opening and toward a driver seat of the vehicle when pivoting along the axis toward the open position; and
a storage element that is situated outside a field of vision of a vehicle occupant in the closed position of the instrument panel, wherein the storage element is accessible to a vehicle occupant when the instrument panel is in the open position but is not accessible to the vehicle occupant when the instrument panel is in the closed position.

20. The multifunction device of claim 19, further comprising:
a lock adapted to fix the instrument panel in a desired position, including an intermediate position between the open and closed position.

* * * * *